US011424497B2

(12) United States Patent
Hwang et al.

(10) Patent No.: US 11,424,497 B2
(45) Date of Patent: Aug. 23, 2022

(54) BATTERY MODULE AND BATTERY PACK INCLUDING THE SAME

(71) Applicant: SK INNOVATION CO., LTD., Seoul (KR)

(72) Inventors: Jae Il Hwang, Daejeon (KR); Tae Gu Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 69 days.

(21) Appl. No.: 16/547,073

(22) Filed: Aug. 21, 2019

(65) Prior Publication Data

US 2020/0067155 A1 Feb. 27, 2020

(30) Foreign Application Priority Data

Aug. 21, 2018 (KR) .......................... 10-2018-0097130

(51) Int. Cl.
| | | |
|---|---|---|
| *H01M 10/6554* | (2014.01) | |
| *H01M 10/613* | (2014.01) | |
| *H01M 10/6551* | (2014.01) | |
| *H01M 10/6556* | (2014.01) | |
| *H01M 10/6567* | (2014.01) | |
| *H01M 50/20* | (2021.01) | |

(52) U.S. Cl.
CPC ..... *H01M 10/6554* (2015.04); *H01M 10/613* (2015.04); *H01M 10/6551* (2015.04); *H01M 10/6556* (2015.04); *H01M 10/6567* (2015.04); *H01M 50/20* (2021.01); *H01M 2220/20* (2013.01)

(58) Field of Classification Search
CPC ............. H01M 10/6554; H01M 50/20; H01M 10/6556; H01M 10/6551; H01M 10/6567; H01M 10/613; H01M 2220/20; H01M 10/625; H01M 10/647; H01M 10/617; Y02E 60/10
See application file for complete search history.

(56) References Cited

U.S. PATENT DOCUMENTS

| | | | | |
|---|---|---|---|---|
| 2012/0237805 A1* | 9/2012 | Abels | .................. | H01M 10/613 |
| | | | | 429/83 |
| 2013/0209856 A1* | 8/2013 | Lev | ...................... | H01M 10/625 |
| | | | | 429/120 |
| 2014/0186693 A1* | 7/2014 | Tyler | ...................... | B29C 65/00 |
| | | | | 429/186 |
| 2014/0342195 A1* | 11/2014 | Bhola | ............... | H01M 10/6555 |
| | | | | 429/50 |
| 2016/0204486 A1* | 7/2016 | Kenney | ..................... | F28F 3/12 |
| | | | | 429/120 |

FOREIGN PATENT DOCUMENTS

| | | |
|---|---|---|
| KR | 10-2014-0140679 A | 12/2014 |
| KR | 10-2014-0144945 A | 12/2014 |
| KR | 10-2017-0006171 A | 1/2017 |
| KR | 10-2017-0014924 A | 2/2017 |
| KR | 10-2017-0021122 A | 2/2017 |
| KR | 20170021122 A † | 2/2017 |
| KR | 10-2017-0107798 A | 9/2017 |
| KR | 10-1778667 | 9/2017 |
| KR | 20180029856 A † | 3/2018 |
| KR | 10-2018-0053418 A | 5/2018 |
| KR | 20180053418 A † | 5/2018 |

OTHER PUBLICATIONS

Office Action issued by the KIPO dated Jun. 18, 2021.
Notice of Allowance issued by the Korean Intellectual Property Office on Dec. 7, 2021.

* cited by examiner
† cited by third party

*Primary Examiner* — Muhammad S Siddiquee
(74) *Attorney, Agent, or Firm* — IP & T Group LLP (57) ABSTRACT

The present invention provides a battery module, which includes a plurality of battery cells with stacked each other which include a cell body configured to house an electrode assembly and electrode tabs drawn out from the cell body, respectively; and a housing unit configured to enclose at least a portion of an outer surface of the plurality of stacked battery cells to house the plurality of stacked battery cells, wherein the housing unit includes a heat sink unit having a refrigerant flow passage formed therein.

10 Claims, 5 Drawing Sheets

BATTERY MODULE AND BATTERY PACK INCLUDING THE SAME

CROSS-REFERENCE TO RELATED APPLICATION

This application claims priority to Korean Patent Applications No. 10-2018-0097130 filed on Aug. 21, 2018 in the Korean Intellectual Property Office (KIPO), the entire disclosure of which is incorporated by reference herein.

BACKGROUND OF THE INVENTION

1. Field of the Invention

One embodiment of the present invention relates to a battery module and a battery pack including the battery module.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. In particular, the above-described secondary battery is manufactured in a form of a battery module form by connecting a plurality of cells with each other in series and/or in parallel, and then placed and used on a high-output hybrid vehicle.

Meanwhile, heat is generated by an electrochemical reaction during charging or discharging of the secondary battery. At this time, if the heat of the battery module is not effectively removed therefrom, a deterioration of the battery module may be accelerated, or safety problems such as ignition or explosion may occur.

Conventionally, in order to prevent the above-described secondary battery from being overheated, cooling methods, in which a water-cooled heat sink is located on a lower side of the battery module including a plurality of secondary cells to cool the battery module, or at least a portion of the battery module is exposed to an outside to be cooled by an outside air, are used in the art.

However, in a case of a water-cooled type using the above-described heat sink, a module housing for enclosing battery cells and the heat sink are separated from each other. Therefore, in order to dissipate heat generated from the battery cells, there is a need to form a heat transfer path leading to a housing plate and the heat sink from the battery cells, such that the formed heat transfer path should pass through the housing plate.

In addition, when preparing a battery pack by including a plurality of battery modules, a plurality of battery modules are generally placed on one heat sink located at a bottom surface of the battery pack. In this case, there is a problem that a degree of cooling varies depending on the location of each of the battery modules.

For example, Korean Patent Registration No. 10-1778667 (registered on Sep. 8, 2017) discloses a battery module including unit modules in which a cooling fin is disposed between battery cells with being in contact therewith, and cooling plates on which the unit modules are mounted, however, it did not solve the above-described problems.

SUMMARY OF THE INVENTION

It is an object of embodiments of the present invention to provide a battery module capable of maximizing space utilization by forming a module housing and a heat sink integrally with each other, which has been separated from each other in the art, and a battery pack including the battery module.

In addition, another object of embodiments of the present invention is to provide a battery module in which inner battery cells and a heat sink may come into direct contact with each other to increase cooling efficiency, and a battery pack including the battery module.

Further, another object of embodiments of the present invention is to provide a battery module that may uniformly cool each of a plurality of battery modules in a battery pack unit, and a battery pack including the same.

Further, another object of embodiments of the present invention is to provide a battery module which may easily control a degree of cooling of a plurality of battery modules in a battery pack unit, and a battery pack including the battery module.

Furthermore, another object of embodiments of the present invention is to provide a battery module in which the number of battery cells included in one battery module is increased in a battery pack unit, thereby reducing the number of connection members for connecting battery modules, etc., and a battery pack including the battery module.

To accomplish the above objects, according to an aspect of the present invention, there is provided a battery module including: a plurality of battery cells which include a cell body configured to house an electrode assembly and electrode tabs drawn out from the cell body, respectively, and are stacked on each other; and a housing unit configured to enclose at least a portion of an outer surface of the plurality of stacked battery cells to house the plurality of stacked battery cells, wherein the housing unit includes a heat sink unit having a refrigerant flow passage formed therein.

The heat sink unit may be integrally formed with the housing unit so as to enclose at least one outer surface of the plurality of stacked battery cells.

The heat sink unit may be located on at least one side of the remaining sides of the battery cells, in which the electrode tab is not located among outer surfaces thereof on a plane perpendicular to a direction in which the plurality of battery cells are stacked.

The heat sink unit may come into direct contact with the plurality of stacked battery cells to cool the plurality of battery cells.

The heat sink unit may include: a first heat sink member located on at least one side of the outer surfaces of the plurality of stacked battery cells; and a second heat sink member formed to be combined with the first heat sink member so as to form a refrigerant flow passage by combining with the first heat sink member.

The first heat sink member may include a first flow passage formed on an outer surface thereof by pressing to the plurality of battery cells side so as to form the refrigerant flow passage by combining the first heat sink member and the second heat sink member with each other.

The second heat sink member may include a second flow passage formed on an inner surface thereof by pressing to a side opposite to the plurality of battery cells so as to form the refrigerant flow passage by containing the first heat sink member and the second heat sink member with each other.

One side face of each of the plurality of battery cells may be an close contact portion which is formed by contacting a case to the electrode assembly on one side except for three sides on which a sealing part is formed by contacting the case enclosing the electrode assembly among circumferential surfaces of the battery cell in a longitudinal direction thereof.

The heat sink unit may be located on a side of the close contact portion of the plurality of stacked battery cells.

According to another aspect of the present invention, there is provided a battery pack including: the plurality of battery modules according to any one of claims 1 to 9; and at least one module bus bar configured to electrically connect two battery modules disposed adjacent to each other among the plurality of battery nodules.

The battery pack may further include a pack housing which does not include a heat sink through which a refrigerant flows, and is configured to house the plurality of battery modules.

According to the embodiments of the present invention, it is possible to maximize space utilization by forming a module housing and a heat sink integrally with each other, which has been separated from each other in the art.

In addition, according to the embodiments of the present invention, the inner battery cells and the heat sink may come into direct contact with each other, thereby increasing the cooling efficiency.

In addition, according to the embodiments of the present invention, it is possible to uniformly cool each of the plurality of battery nodules in the battery pack unit.

In addition, according to the embodiments of the present invention, it is possible to easily control the degree of cooling of the plurality of battery modules in the battery pack unit.

In addition, according to embodiments of the present invention, since the number of battery cells included in one battery module is increased in the battery pack unit, the number of connection members for connecting the battery modules, etc. may be reduced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein similar reference characters designate similar or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 1:
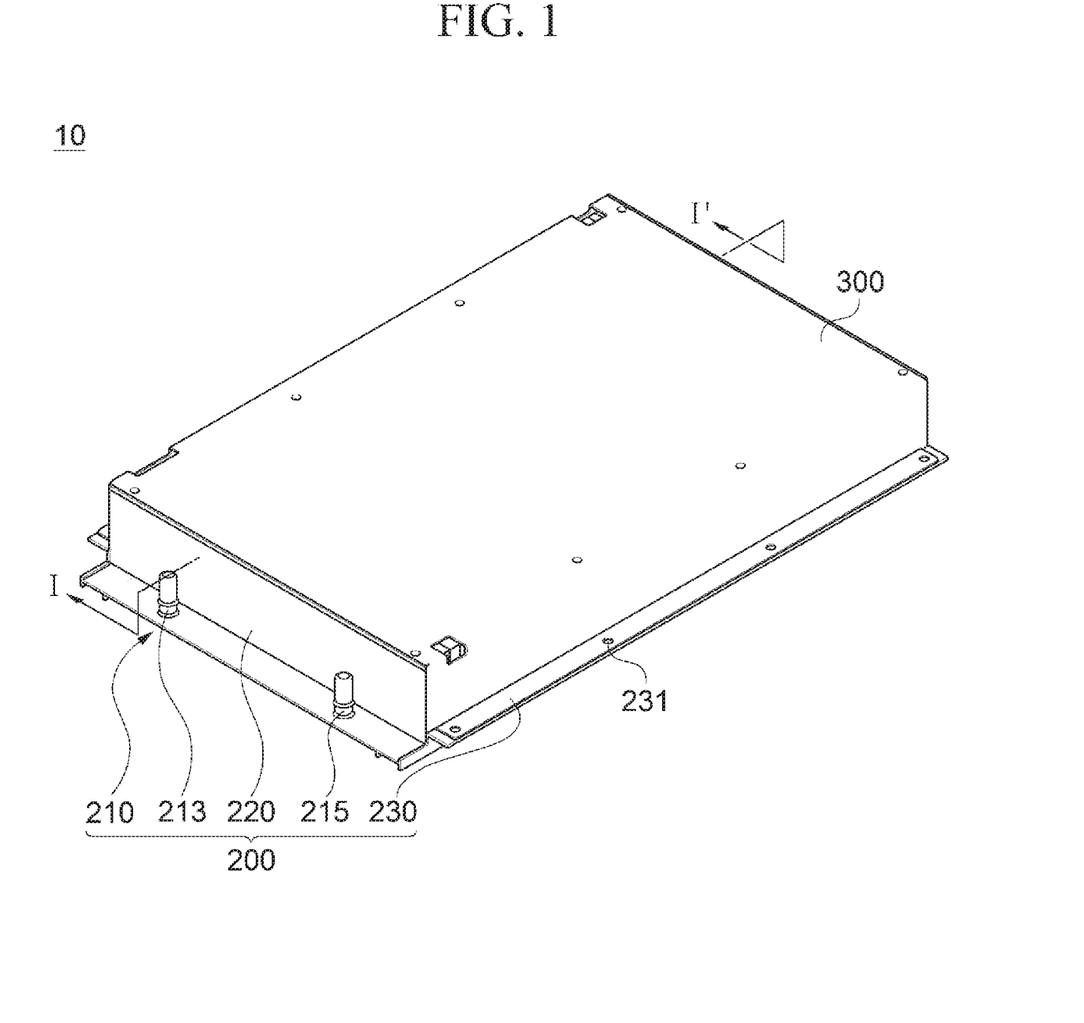
FIG. 1 is a perspective view illustrating a battery module according to an embodiment of the present invention.
Figure 2:
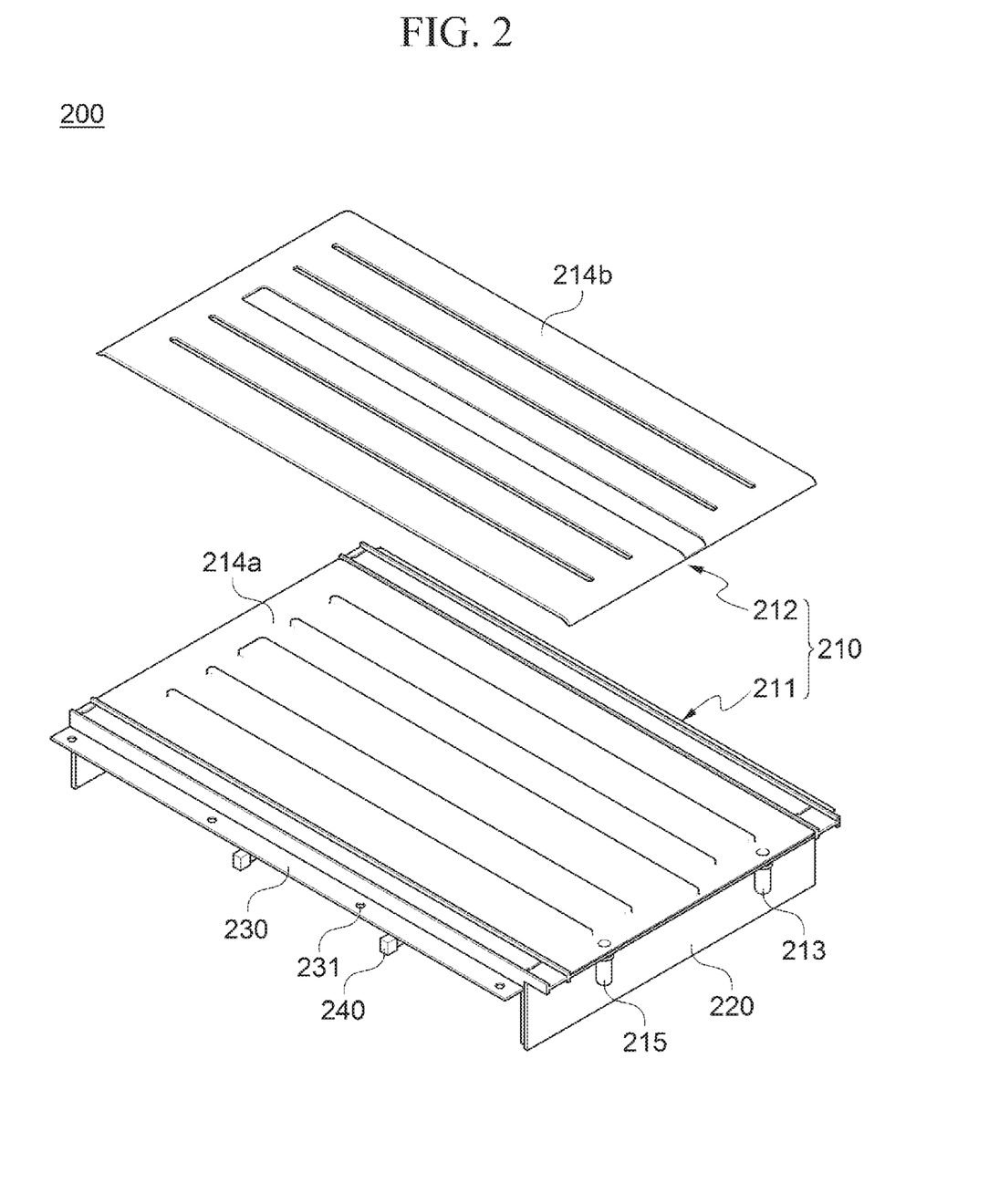
FIG. 2 is an exploded perspective view illustrating a housing unit included in the battery module according to the embodiment of the present invention.
Figure 3:
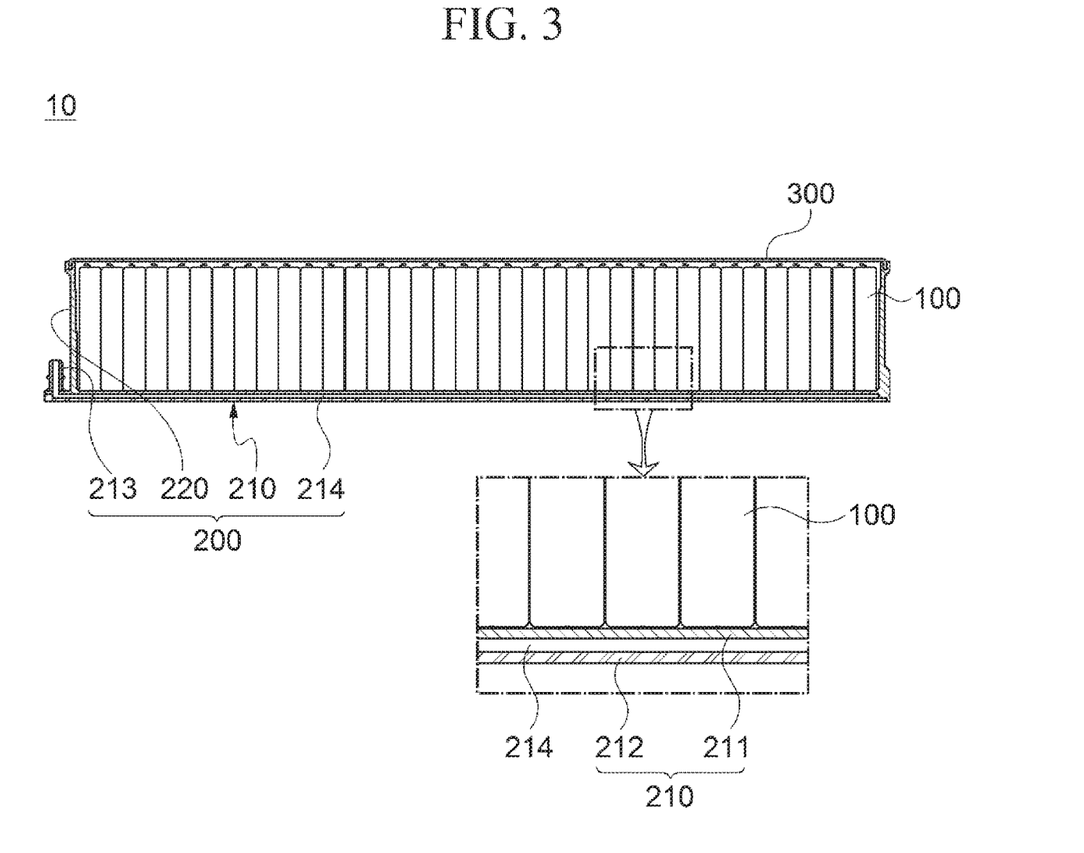
FIG. 3 is a cross-sectional view taken on line I-I' of the battery module according to the embodiment of the present invention shown in FIG. 1, and a partial enlarged view thereof.

FIG. 1 is a perspective view illustrating a battery module 10 according to an embodiment of the present invention, FIG. 2 is an exploded perspective view illustrating a housing unit 200 included in the battery module 10 according to the embodiment of the present invention, and FIG. 3 is a cross-sectional view taken on line I-I' of the battery module 10 according to the embodiment of the present invention shown in FIG. 2, and a partial enlarged view thereof.

Referring to FIGS. 1 to 3, the battery module 10 according to the embodiment of the present invention may include a plurality of stacked battery cells 100, and a housing unit 200 configured to enclose at least a portion of the outer surfaces of the plurality of stacked battery cells 100. At this time, the above-described housing unit 200 may include a heat sink unit 210 having a refrigerant flow passage 214 formed therein to cool the plurality of battery cells 100 to be housed in the housing unit 200.

The housing unit 200 further includes an inflow port 213 and an outflow port communicating with the refrigerant flow passage 214. Thereby, as illustrated in FIGS. 1 to 3, a refrigerant such as coolant may inflow into the inflow port 213 of the heat sink unit 210 and outflow from the outflow port 215 through the refrigerant flow passage 214, thereby cooling the plurality of battery cells 100 housed in the housing unit 200 during this flowing process.

In addition, the heat sink unit 210 may be formed integrally with the housing unit 200 to form at least one surface of the housing unit 200. That is, in the battery module 10 according to the embodiment of the present invention, a module housing and the heat sink are integrally formed with each other, which has been separated from each other in the art, such that volumes of the battery module 10 and a battery pack (illustrated in FIG. 5), which will be described below, including the battery modules 10 according to the embodiment of the present invention may be reduced, and space efficiency may be increased to improve energy efficiency.

Further, in a case of the conventional battery module located on the heat sink in the art, a heat conduction from the battery cells to the heat sink is performed through a lower cooling plate of the module housing, but the battery module 10 according to the embodiment of the present invention includes the heat sink unit 210 which is formed immediately below a plurality of the battery cells 100, such that a heat conduction distance may be decreased to improve the cooling efficiency.

Accordingly, the battery module 10 according to the embodiment of the present invention has an increased cooling efficiency compared to the conventional battery module, such that the number of battery cells 100 that can be housed in one battery module 10 may be increased. As a result, the number of battery modules 10 included in one battery pack 1 is reduced, such that assembly performance of the battery pack 1 may be enhanced, and an energy density of the battery module 10 may be improved.

In addition, the heat sink unit 210 of the battery module 10 according to the embodiment of the present invention is integrally formed with the housing unit 200 to form one surface of the housing unit 200. Therefore, even if the number of the battery cells 100 housed in the housing unit 200 is increased or decreased, a structure in which the heat sink unit 210 is integrally formed with the housing unit 200 may be maintained by adjusting a length of the housing unit 200 in a direction in which the battery cells 100 are stacked ('stacking direction').

Specifically, each of the above-described battery cells 100 includes a cell body 110 (shown in FIG. 4A) for housing an electrode assembly (shown in FIG. 4B), and electrode tabs drawn out from the cell body 110. Herein, the plurality of battery cells 100 may be overlapped with adjacent cell bodies 110 and stacked on each other.

The heat sink unit 210 may be located on at least one side of the remaining sides of the battery cells 100, in which the electrode tab 120 is not located among outer surfaces thereof on a plane perpendicular to the stacking direction of the plurality of stacked battery cells 100, and may cool the plurality of battery cells 100 by directly coming into contact with at least one surface of the plurality of stacked battery cells 100.

Preferably, the heat sink unit 210 may be located on any one side (for example, a lower side in the drawings) of sides in which the electrode tab 120 does not protrude among the outer surfaces thereof formed by stacking the plurality of battery cells 100. That is, the heat sink unit 210 is located on the lower side of the cell body 110, in which the electrode tab 120 does not protrude, among the outer surfaces thereof formed by stacking the plurality of battery cells 100, and may dissipate heat generated in the battery cells 100 to an outside. The above-described heat sink unit 210 may form a bottom surface of the housing unit 200 for housing the plurality of battery cells 100.

Meanwhile, the above-described heat sink unit 210 may include a first heat sink member 211 located on at least one side (for example, the lower side in the drawings) of outer surfaces of the plurality of the stacked battery cells 100, and a second heat sink member 212 which is formed to be combined with the first heat sink member 211 and forms the refrigerant flow passage 214 by combining with the first heat sink member 211. At this time, at least one of the first heat sink member 211 and the second heat sink member 212 may have flow passages 214a and 214b formed therein, and the refrigerant flow passage 214 may be formed therein by combining the first heat sink member 211 and the second heat sink member 212.

Specifically, the first heat sink member 211 and the second heat sink member 212 may be formed in a thin plate shape, respectively. Herein, a first flow passage 214a may be formed on an outer surface of the first heat sink member 211 opposite to a side contacting with the plurality of battery cells 100 by pressing in a predetermined depth to the plurality of battery cells 100 side, and a second flow passage 214b may be formed on an inner surface of the second heat sink member 212 on a side in which the first heat sink member 211 is located, by pressing in a predetermined depth to a side opposite to the plurality of battery cells 100. In addition, each of the first flow passage 214a and the second flow passage 214b may be formed at positions corresponding to each other on the outer surface of the first heat sink member 211 and the inner surface of the second heat sink member 212, respectively.

At this time, the first heat sink member 211 and the second heat sink member 212 may be combined with face each other, and the above-described refrigerant flow passage 214 may be formed by the combination of the first flow passage 214a and the second flow passage 214b obtained when combining the first heat sink member 211 and the second heat sink member 212 with each other. That is, as described above, the heat sink unit 210 of the battery module 10 according to the embodiment of the present invention is formed by combining the first heat sink member 211 and the second heat sink member 212 with each other. Therefore, the refrigerant flow passage 214 may be easily designed and changed. Further, when the battery module 10 is in use, the first heat sink member 211 and the second heat sink member 212 may be separated from each other to manage the state of the refrigerant flow passage 214 and the like. Therefore, the convenience of a user may be increased.

Meanwhile, the first heat sink member 211 and the second heat sink member 212 may be combined with each other by thermal fusion bonding or the like, but it is merely an example, and it is not limited thereto. For example, the first heat sink member 211 and the second heat sink member 212 may be combined with each other by a mechanical method such as fastening of hooks and the like.

However, the above-described refrigerant flow passage 214 is not limited to the configuration in which the flow passages 214a and 214b are formed in the first heat sink member 211 and the second heat sink member 212, respectively, and the flow passages 214a and 214b may be formed in any one of the first heat sink member 211 and the second heat sink member 212 such that the refrigerant flow passages 214 can be formed by combining the first heat sink member 211 and the second heat sink member 212 with each other.

Further, the refrigerant flow passage 214 provided in the heat sink unit 210 of the battery module 10 according to the embodiment of the present invention may be formed in a U-shape as a whole, and more specifically, may include three flow passages communicating with the inflow port 213 side, and three flow passages communicating with the outflow port 215 side. That is, the refrigerant flow passage 214 is not formed in a manner to be bent a plurality of times, but the refrigerant introduced into inflow port 213 on one side of the heat sink unit 210 may flow to the other side of the heat sink unit 210 through the three flow passages, and then may flow from the other side to the one side of the heat sink unit 210 to be discharged to the outflow port 215 side by chaining the flowing direction about 180 degrees.

During the refrigerant inflows into the inflow port 213 on one side of the heat sink unit 210 and flows through the refrigerant flow passage 214 toward the other side as described above, an area of one half of one side of the plurality of battery cells 100 may be cooled from the one side toward the other side of the heat sink unit 210, and during the refrigerant flows through the refrigerant flow passage 214 and outflows from the outflow port 215 by changing the flowing direction from the other side to the one side, an area of the other half may be uniformly cooled. That is, one surface of the plurality of battery cells 100 may be uniformly cooled.

Meanwhile, the above-described housing unit 200 may include side cover parts 220 located on the remaining sides of the battery cells, in which the heat sink unit 210 is not located among the outer surfaces of the plurality of battery cells enclosed by the housing 200. Further, the housing unit

200 may include mounting parts 230 formed by protruding from at least one portion thereof at a predetermined position higher than the heat sink unit 210, on which the battery module 10 is placed when preparing a battery pack 1 to be described below. In this case, the above-described mounting part 230 may be formed at an outer surface of the housing unit 200 in a stepped shape with respect to the heat sink unit 210. In addition, the above-described mounting part 230 may have a plurality of fastening holes 231 formed therein, such that the battery module 10 and a pack housing (illustrated in FIG. 5), which will be described below, may be combined and fixed by a fastening member (not illustrated) such as a bolt inserted into the fastening hole 231.

Further, the battery module 10 according to the embodiment of the present invention may be combined with the housing unit 200, and may include a housing sheath 300 configured to enclose the remaining outer surfaces of the outer surfaces of the plurality of battery cells 100, which are not enclosed by the housing unit 200. That is, six surfaces of the stacked battery cells 100 are enclosed by the housing unit 200 and the housing sheath 300, such that the battery cells 100 may be protected from external foreign substances and the like.

Furthermore, the housing unit 200 may further include at least one barrier 240 formed on the side of the heat sink unit 210 on which the plurality of battery cells 100 are placed, so as to be spaced apart from each other at a predetermined interval. In this case, the barrier 240 may be formed in a plate shape facing the adjacent battery cells 100. When the number of stacked battery cells 100 exceeds a predetermined number, the barriers 240 may be disposed between the predetermined number of battery cells 100, such that a rigidity of the plurality of stacked battery cells 100 in the stacking direction may be reinforced, and expansion of a battery ceil 100 caused by using the battery module 10 may be suppressed.

Figure 4A:
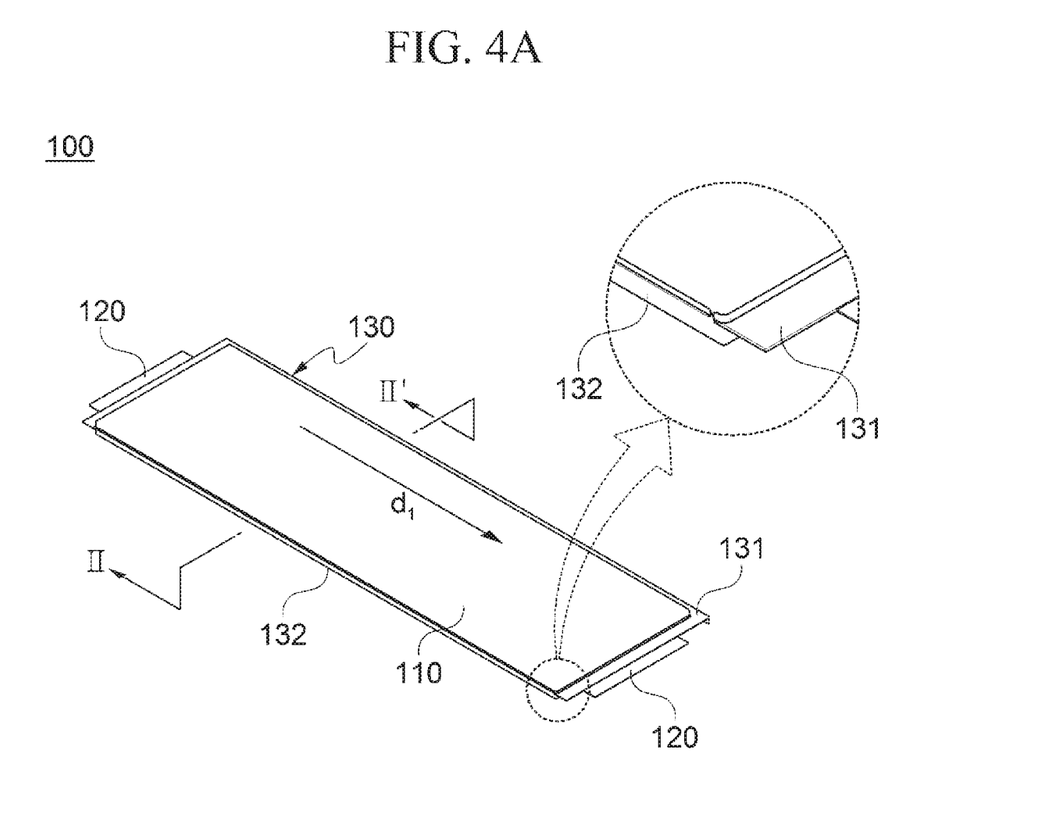
FIG. 4A is a perspective view and a partial enlarged view illustrating a battery cell of the battery module according to the embodiment of the present invention.
Figure 4B:
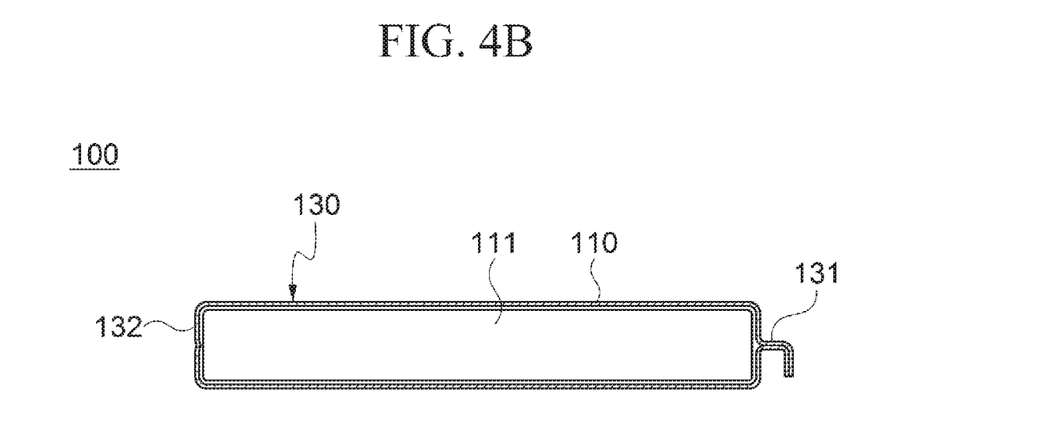
FIG. 4B is a cross-sectional view taken on line II-II' of the battery cell shown in FIG. 4A.

FIG. 4A is a perspective view and a partial enlarged view illustrating the battery ceil 100 of the battery module 10 according to the embodiment of the present invention, and FIG. 4B is a cross-sectional view taken on line II-II' of the battery cell 100 shown in FIG. 4A

Referring to FIGS. 4A and 4B, each of the plurality of battery cells 100 housed in the battery module 10 according to the embodiment of the present invention may include a cell body 110 for housing an electrode assembly 111, and electrode tabs 120 drawn out from the cell body 110. In this case, the above-described electrode tabs 120 may be drawn out from the electrode assembly 111, and each of the battery cells 100 may further include a case 130 for enclosing the electrode assembly 111. That is, the portion of the electrode assembly 111 enclosed by the case 130 may be considered as the cell body 110.

Meanwhile, one side face of the battery cell 100 may be an close contact portion 132 which is formed by contacting the case 130 to the electrode assembly 111 on one side except for three sides on which a sealing part 131 is formed by contacting the case 130 among circumferential surfaces of the battery cell 100 in a longitudinal direction d1 thereof.

At this time, the above-described longitudinal direction d1 of the battery ceil 100 may be referred to a direction in which the electrode tabs 120 of the battery cell 100 protrude, as shown in FIG. 4A. In addition, the above-described circumferential surface in the longitudinal direction d1 of the battery cell 100 may be referred to a circumferential surface perpendicular to a thickness direction of the battery cell 100.

As described above, one side face of each of the battery cells 100 may be formed as the close contact portion 132 formed by contacting the case 130 to the electrode assembly 111. At this time, the close contact portion 132 of the battery cell 100 may be formed in such a manner that a central portion of the case 130 of the battery cell 100 on one side among the circumferential surfaces in the longitudinal direction d1 of the battery cell 100 is contacted to one surface of the electrode assembly 111.

That is, the close contact portion 132 does not simply mean a surface that is not sealed among the circumferential surfaces in the longitudinal direction d1 of the battery cell 100, but is a portion formed by contacting the case 130 and the electrode assembly 111 with each other.

Further, the above-described heat sink unit 210 of the housing unit 200 may be located on the close contact portion 132 side of the plurality of stacked battery cells 100. Specifically, each of the above-described plurality of battery cells 100 may be stacked so that the close contact portions 132 are located on the same layer, and the heat sink unit 210 may be located on the close contact portions 132 side of the plurality of stacked battery cells 100.

Thereby, the close contact portions 132 and the heat sink unit 210 of the plurality of battery cells 100 may come into contact with each other, and the close contact portions 132 formed by contacting the case 130 to the electrode assembly 111 may also come into contact with the heat sink unit 210, thereby proper cooling of the battery cells 100 may be achieved. That is, a contact area between the heat sink unit 210 and the battery cell 100 is increased, and a heat transfer path from the electrode assembly 111 to the heat sink 210 of the battery cell 100 is decreased, such that the cooling efficiency of the battery cell 100 of the heat sink unit 210 may be improved.

Figure 5:
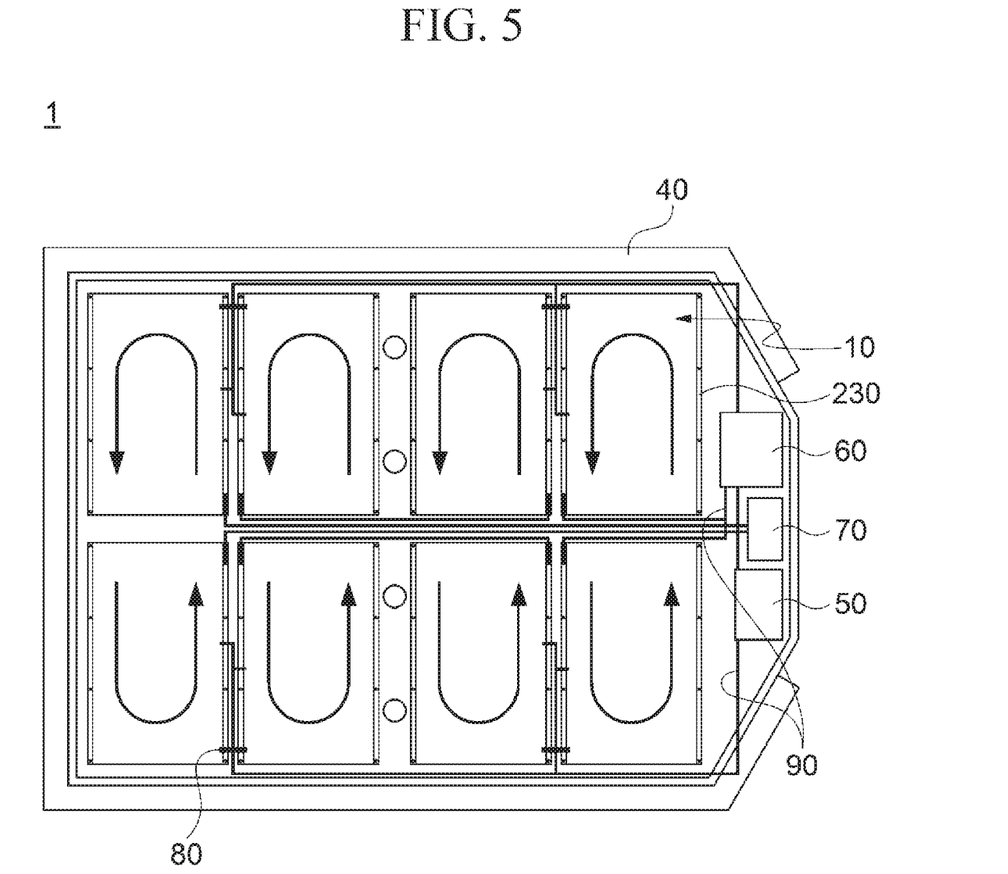
FIG. 5 is a schematic view illustrating a state in which the battery modules according to the embodiment of the present invention are disposed in a battery pack.

FIG. 5 is a schematic view illustrating a state in which the battery modules 10 according to the embodiment of the present invention are disposed in the battery pack 1.

Referring to FIG. 5, the battery pack 1 including the plurality of battery modules 10 according to the embodiment of the present invention may further include a battery management system (BMS) module 50 capable of controlling each of the plurality of battery modules 30, a power relay assembly (PRA) module 60 which is located between the plurality of battery modules 10 and a motor driving unit (not illustrated) outside the battery pack 1, and includes relays (not illustrated), resistances (not illustrated), etc., and a manual service device (MSD) module 70 capable of determining whether a voltage is applied to a pack high voltage terminal (not illustrated) by an operation of an operator between transportation and installation of the battery pack 1.

Specifically, the battery pack 1 including the battery module 10 according to the embodiment of the present invention may further include a pack housing 40 for housing the plurality of battery modules 10, the QMS module 50, the PRA module 60, and the MSD module 70. Herein, the plurality of battery modules 10 may be placed on the pack housing 40 to be disposed side by side.

Meanwhile, in each of the above-described battery modules 10, the heat sink unit 210 is integrally formed with the housing unit 200. Therefore, the pack housing 40 may not include a heat sink through which the refrigerant flows.

Further, the above-described plurality of battery modules 10 may be connected with each other by a module bus bar 80 and connected in series or parallel. Furthermore, each of the plurality of battery modules 10 and the above-described BMS module 50, the PRA module 60 and the MSD module 70 may be connected by a connection member 90 such as a cable.

As described above, in the battery pack 1 including the battery module 10 according to the embodiment of the present invention, the heat sink unit 210 is integrally provided in each of the battery modules 10, such that the plurality of battery modules 10 inside the battery pack 1 may be uniformly cooled, and the degree of cooling of each of the plurality of battery modules 10 may be easily controlled.

In this case, an example of a state in which the refrigerant is introduced and discharged in each of the plurality of battery modules 10 is illustrated by arrows in FIG. 5.

Furthermore, in the battery module 10 according to the embodiment of the present invention, the number of the battery cells 100 housed in one battery module 10 is increased. Therefore, as compared with the conventional battery pack 1, the same number of battery cells 100 may also be housed by the small number of battery modules 10, and as the number of battery modules 10 is reduced, such that the number of required components such as the module bus bars 80 and the connection member 90 for connecting the battery modules 10 with each other may be reduced.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

INSCRIPTION OF REFERENCE NUMERALS

1: Battery pack
10: Battery module
100: Battery cell
110: Cell body
111: Electrode assembly
120: Electrode tab
130: Case
131: Sealing part
132: Close contact portion
200: Housing unit
210: Heat sink unit
211: First heat sink member
212: Second heat sink member
213: Inflow port
214: Refrigerant flow passage
214a: First flow passage
214b: Second flow passage
215: Outflow port
220: Side cover part
230: Mounting part
240: Barrier
231: Fastening hole
300: Housing sheath
40: Pack housing
50: BMS module
60: PRA module
70: MSD module
80: Module bus bar
90: Connection member
d1: Longitudinal direction of the battery cell

What is claimed is:

1. A battery module comprising:
a plurality of stacked battery cells each including an electrode assembly and a case for accommodating the electrode assembly; and
a module housing configured to house the plurality of stacked battery cells;
wherein the module housing includes:
a housing unit configured to enclose at least a portion of outer surfaces of the plurality of stacked battery cells to house the plurality of stacked battery cells;
a housing sheath configured to enclose remaining outer surfaces of the plurality of stacked battery cells and combined with the housing unit;
wherein the housing unit includes a heat sink unit having a refrigerant flow passage formed therein and the heat sink unit serves as a bottom surface of the module housing to cool the plurality of stacked battery cells,
wherein each of the plurality of stacked battery cells includes:
a sealing part formed on three sides of four sides of the case; and
a non-sealing part formed on one remaining side of the four sides of the case,
wherein the heat sink unit locates only on the non-sealing part of the plurality of stacked battery cells, and does not locate on the sealing part of the plurality of stacked battery cells.

2. The battery module according to claim 1, wherein the heat sink unit is integrally formed with the housing unit so as to enclose at least one outer surface of the plurality of stacked battery cells.

3. The battery module according to claim 1, wherein the heat sink unit is located on at least one side where the electrode tab is not located.

4. The battery module according to claim 1, wherein the heat sink unit comes into direct contact with the plurality of stacked battery cells to cool the plurality of battery cells.

5. The battery module according to claim 1, wherein the heat sink unit comprises: a first heat sink member located on at least one side of the outer surfaces of the plurality of stacked battery cells; and
a second heat sink member formed to be combined with the first heat sink member so as to form the refrigerant flow passage by combining with the first heat sink member.

6. The battery module according to claim 5, wherein the first heat sink member includes a first flow passage formed on an outer surface thereof by pressing to the plurality of battery cells side so as to form the refrigerant flow passage by combining the first heat sink member and the second heat sink member with each other.

7. The battery module according to claim 5, wherein the second heat sink member includes a second flow passage formed on an inner surface thereof by pressing to a side opposite to the plurality of battery cells so as to form the refrigerant flow passage by combining the first heat sink member and the second heat sink member with each other.

8. A battery pack comprising:
a plurality of battery modules according to claim 1; and
at least one module bus bar configured to electrically connect two battery modules disposed adjacent to each other among the plurality of battery modules.

9. The battery pack according to claim 8, further comprising a pack housing which does not include a heat sink through which a refrigerant flows, and is configured to house the plurality of battery modules.

10. The battery pack according to claim 9, wherein the module housing further comprises a mounting part configured to be coupled to the pack housing.

* * * * *